United States Patent Office 3,537,656
Patented Nov. 3, 1970

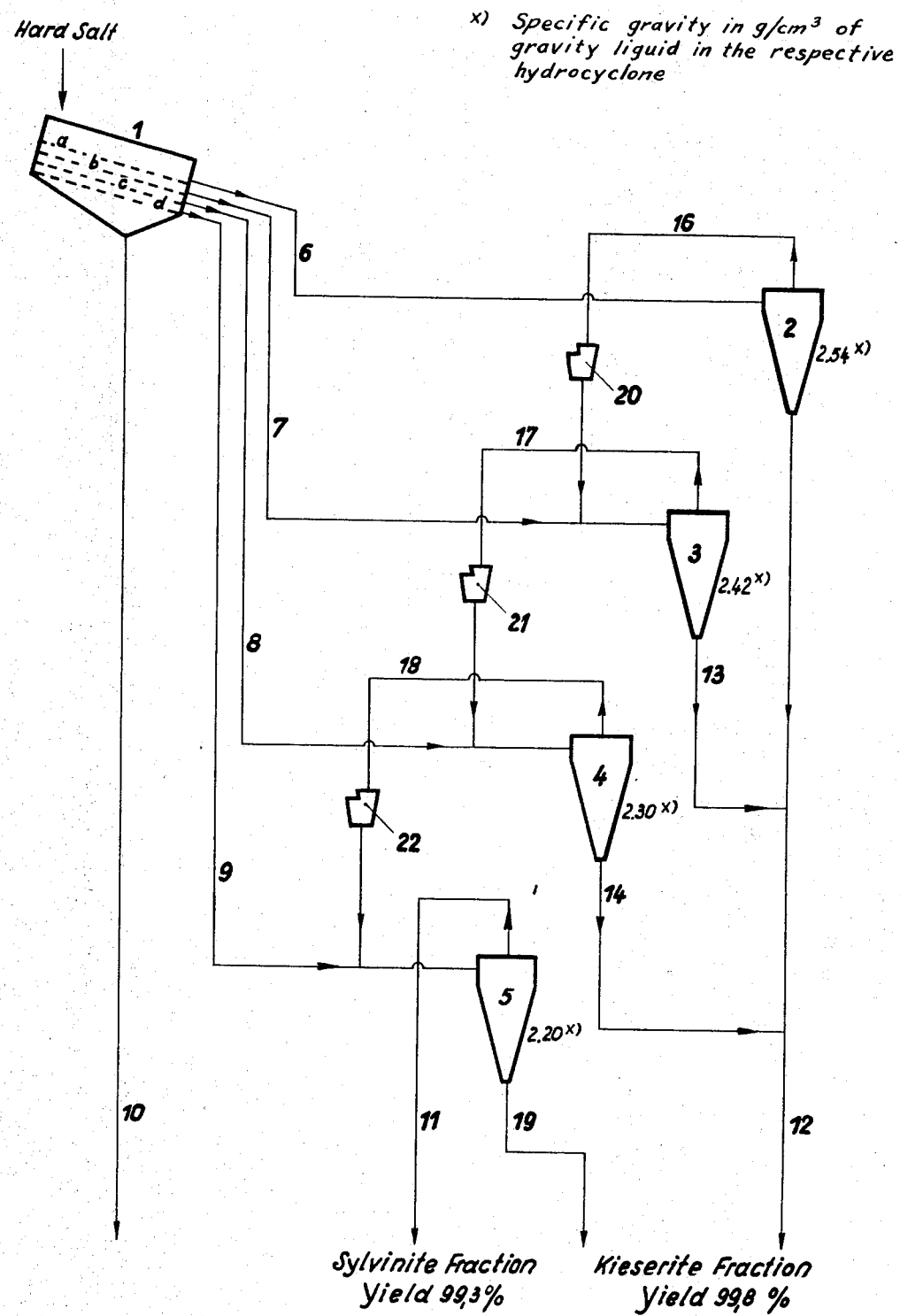

3,537,656
PROCESS FOR THE UPGRADING OF POTASH MINERALS CONSISTING ESSENTIALLY OF HARD SALTS
Hans Henne and Arno Singewald, Kassel, Germany, assignors to Wintershall Aktiengesellschaft, Hauptverwaltung Kassel, Germany
Continuation-in-part of application Ser. No. 593,563, Nov. 10, 1966. This application May 8, 1969, Ser. No. 822,895
Int. Cl. B02c *21/00*
U.S. Cl. 241—20                     4 Claims

ABSTRACT OF THE DISCLOSURE

A continuous process for the upgrading of potash minerals consisting essentially of hard salts by gravity separation in a plurality of hydrocyclones respectively containing gravity liquids of different specific gravity to obtain kieserite and so-called "quasi-sylvinite" therefrom.

CROSS-REFERENCE TO RELATED APPLICATION

The present application is a continuation-in-part application of the copending application Ser. No. 593,563 filed Nov. 10, 1966, and now abandoned.

BACKGROUND OF THE INVENTION

The present invention relates to a continuous process for the upgrading of potash minerals consisting essentially of hard salt by gravity separation to obtain kieserite and so-called "quasi-sylvinite" therefrom.

The increasing demand for potash fertilizers requires extended processing of potash minerals which contain magnesium salts, NaCl, and other constituents. Particularly, magnesium sulfate embodying minerals such as kieserite, a constituent, for instance, of hard salts, handicaps the enrichment of potash salts, as the dissolved magnesium sulfate forms objectionable double salts with potassium, thereby reducing the yield of potassium salts in the crystallisate. On the other hand, the constituents are often present in large amounts and their removal is therefore desirable, or even necessary, before processing the potash fertilizers themselves.

Although various processes have been described to avoid the disadvantages mentioned above, up to now no convenient and economical method has been found for preparing starting materials with high potassium content, especially from minerals containing magnesium sulfate.

A process is known for the manufacture of high-grade potash fertilizers from raw materials containing kieserite, especially from hard salts. According to this known process the kieserite is removed by taking advantage of its high specific gravity as compared with the low specific gravity of the potash concentrate, the so-called "quasi-sylvinite." In this known process the raw material is disintegrated to a grain size of less than 1 mm. and the disintegrated material is suspended either in saturated hard salt solutions charged with magnetite or ferrosilicone or in stable organic gravity liquids, such as mixtures of halogenated hydrocarbons with liquids of lower specific gravity, for example tetrabromethane with toluene. The isolation of the two components is then effected by hydrocyclone separation, settling by aeration, or gravity liquid upgrading. It is understood that the separation process as described above can be only as far as breakup of the raw material into separated components is achieved before starting the separation process itself.

This known process has the disadvantage that on using a saturated hard salt solution containing for instance 93 g./l. KCl; 135 g./l. NaCl, 100 g./l. $MgCl_2$, 81 g./l $MgSO_4$ and 875 g./l. $H_2O$, as gravity liquid, considerable amounts of $MgSO_4$ are found to be dissolved due to a slow decomposition of kieserite. The hard salt solution is saturated at normal temperatures only with regard to potassium chloride and sodium chloride. Therefore, magnesium sulfate is dissolved continuously by successive hydration of the kieserite and after reaching this saturation point, magnesium potassium double salts are precipitated.

Whereas the specific weights of sylvinite, which has a specific gravity of 1.98 g./cm.$^3$, and kieserite which has a specific gravity of 2.58 g./cm.$^3$, are so different from each other that gravity separation is possible, the intermediately formed double salts, such as schoenite, which has a specific gravity of 2.03 g./cm.$^3$, leonite, which has a specific gravity of 2.20 g./cm$^3$, kainite, which has a specific gravity of 2.13 g./cm.$^3$, or epsom salt, which has a specific gravity of 1.68 g./cm.$^3$, obstruct the separation process. In case a KCl particle acts as nucleus for the crystallization of a heavy double salt, the average specific gravity of the resulting particle is enlarged and the reverse result is obtained with a kieserite nucleus. Since the hydration and dissolving of kieserite is a slow proceeding reaction, it is to be expected that the above-described difficulties can be avoided or at least minimized by using coarse ground particles for the separation process as the hydration of kieserite increases with increasing surface area to weight ratio. A less disintegrated starting material, however, containing the so-called "middlings," undecomposed mineral particles, cannot be separated completely by a method as mentioned above.

SUMMARY OF THE INVENTION

It is an object of the present invention to provide a process according to which potash concentrates can be obtained in a highly enriched form from mixtures containing such potash values.

It is a further object of the present invention to provide a process according to which potassium and magnesium containing compounds can be separated without formation of double salts to produce potash values in pure form.

It is an additional object of the present invention to provide a process according to which concentrates are recovered having particles with optimum size.

With these and other objects in view which will become apparent as the description proceeds, the process according to the present invention for the manufacture of potash concentrates from potash minerals consisting essentially of hard salts by gravity liquid separation mainly comprises the following steps:

(a) Disintegrating the minerals into coarse particles;
(b) Classifying the disintegrated minerals according to their particle sizes into at least three fractions;
(c) Passing the classified fractions separately into at least three hydrocyclones, which are connected in parallel at the apex discharge ends and in series at the upper ends thereof, and respectively containing gravity liquids of specific gravities, so that the coarsest particle fraction is suspended in the liquid with the highest specific gravity and the smallest particle size fraction in the liquid with the lowest specific gravity and all further particles between the coarsest and the smallest correspondingly in liquids with specific gravities between the highest and lowest specific gravity;

(d) Separately recovering the floated components from the upper end and the settled components from the apex discharge end of each hydrocyclone;

(e) Collecting the settled components consisting of coarse kieserite ($MgSO_4 \cdot H_2O$) from all hydrocyclones;

(f) Disintegrating the floated components from a respective hydrocyclone to a particle size corresponding to the particle size of the particle fraction passed into the next following hydrocyclone having the next lower specific gravity; and (g) Passing the disintegrated components together with freshly classified particles having substantially the same size into the next following hydrocyclone having the next lower specific gravity—at least the steps c–h are carried out continuously to thereby recover highly separable kieserite concentrates in the form of settled components from each hydrocyclone and "quasisylvinite" highly concentrated as floated compoents from the last hydrocyclone.

The process of the present invention avoids a disintegration of the total raw material below a given particle size determined by a preliminary test. In the following table, the pure, not intergrown amounts of kieserite obtained from crude salt are listed in dependency on the particle size:

Table 1

| Particle size (mm.): | Not intergrown kieserite in percent |
|---|---|
| Up to 0.2 | 100 |
| 0.2–0.4 | 97.6 |
| 0.4–0.5 | 92.5 |
| 0.5–0.75 | 79.3 |
| 0.75–1.0 | 69.8 |
| 1.0–1.5 | 51.5 |
| 1.5–2.0 | 20.3 |

In a one-step gravity separation, the starting material must be ground according to Table 1 to a particle size of less than 0.5 mm., order to obtain 92.5% kieserite without intergrowth. With the process according to the present invention in which the disintegrated material is separated in fractions of different particle size and wherein these fractions are subjected to gravity separation in several steps, more than half of the amount of kieserite originally present in the crude salt can be recovered from the particle fraction having a particle size of between 1–2 mm., whereas at least the same or even a higher percentage as mentioned above of kieserite may be recovered from the total charge.

The process of the present invention thus permits the manufacture of coarse kieserite which is of considerable technical advantage as hydration and formation of double salts are avoided. Another advantage of the new process is that it is no longer necessary to consider variations of the raw material resulting from irregularities of the deposits (field sources), as during the performance of the process those particles are selected which have to be further disintegrated, whereas the decomposed constituents of the mineral are separated off.

In view of the high energy demand for grinding processes, another important advantage of the instant process will be appreciated.

The separation velocity in a hydrocyclone deepnds according to the equation of Stokes $(\delta_1 - \delta_2) \cdot d^2$, not only upon the specific gravity of the particle and the gravity liquid, but also upon the average particle diameter of the particles to be separated.

In the above formula, $\delta_1$=the density of the solids, $\delta_2$=the density of the liquid, and $d$=the average particle diameter.

Therefore particles having the same value for $$(\delta_1 - \delta_2) \cdot d^2$$

have also the same separation velocity. Particles having small differences with respect to their densities can be separated only if the particle sized distribution is close.

The process according to the present invention which is carried out in several separation steps in the order of particle size takes into account this relationship between density and volume or diameter of the particles to be separated from each other.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

The drawing is a schematic illustration of apparatus for carrying out the present invention.

DESCRIPTION OF THE PREFERRED EMBODIMENTS

Example 1

A hard salt obtained by mining was ground to a particle size of about 5 mm. and then further disintegrated and classified into 4 grain fractions.

These fractions which were separated in a screening device as schematically shown in FIG. 1 were then separately fed respectively through conduits 6, 7, 8 and 9 into hydrocyclones 2, 3, 4, 5 which respectively contain gravity liquids of decreasing specific weight. Thus hydrocyclone 2 contained a gravity liquid of a specific weight of 2.54 g./cm.³, hydrocyclone 3 contained a liquid of a specific gravity of 2.42 g./cm.³, hydrocyclone 4 contained a liquid with a specific gravity 2.30 g./cm.³ and hydrocyclone 5 contained a liquid with a specific gravity 2.20 g./cm.³. The densities of the gravity liquids in the various hydrocyclones were adjusted to such a value so as to effect an optimum level of concentration with particles as coarse as possible. The floated components of the hydrocyclones 2–4 were respectively discharged from the upper ends of the hydrocyclones through the pipes 16, 17, and 18 to intermediate disintegrators 20–22, wherein these particles were respectively ground down to a particle size substantially corresponding to the particle size of the respective particle fraction fed directly from the screening device 1 into the respective following hydrocyclone and the ground down particles were then fed into the next following hydrocyclone together with the particle fraction which was fed directly from the screening device 1 into the respective hydrocyclone.

The disintegration has to be performed in the disintegrators 20–22, which may be constituted by rolling mills, roll crushers, beaters and the like of known construction, in such a manner to effect further disintegration of the particles without however reducing the average particle size below the particle size of the next following hydrocyclone, that is the fines produced in each of the disintegrators should be less than 20%. The settled components from hydrocyclones 2–4 containing a high percentage of kieserite were removed through the conduits 12, 13 and 14 and separated from the gravity liquids by filtration, sedimentation, or the like. The sediments from hydrocyclone 5 composed of kieserite and NaCl were removed through conduit 19, separated from the liquid and further disintegrated and then fed back after screening in fractions according to grain size into the hydrocyclones. If the sediment of hydrocyclone 5 contains sylvine, the sediment is preferably not fed back into the hydrocyclones but further treated in a dissolving or floatation process. In this case the fines removed from the screening device 1 through the conduit 10 were added to the sediment.

Table 2 gives the sieve analysis of the various fractions, that is, the grain size of the various fractions $a$–$d$ obtained from the screening device 1, the percentage of kieserite in each fraction, the specific gravity of the gravity liquid respectively contained in the hydrocyclones 2–5 into which the various fractions $a$–$d$ are respectively fed from the screening device, the degree of disintegration into separate components obtained in each fraction, and the sieve analysis of the kieserite fractions.

TABLE 2

| | Fraction | | | |
|---|---|---|---|---|
| | a | b | c | d |
| Sieve analysis: | | | | |
| Millimeters | 3–5 | 1.5–3 | 0.8–1.5 | 0.3–0.8 |
| Percent | 10.3 | 27.6 | 33.5 | 28.6 |
| Percent kieserite | 22.6 | 27.2 | 25.5 | 22.9 |
| Gravity liquid (g./cm.³) | 2.54 | 2.42 | 2.30 | 2.20 |
| Degree of disintegration into separate components, percent | 55 | 78 | 93 | 99 |
| Sieve analysis of the kieserite fraction, percent | 5.7 | 30.3 | 38.6 | 25.4 |

Table 3 shows more specifically the amount of kieserite and other components, that is so-called quasi-sylvinites passed ino and discharged from each of the hydrocyclones for a total charge of 100 kilograms of raw material.

of kieserite obtained from the settled components of the various hydrocyclones are listed:

TABLE 4

| | Fraction | | | | |
|---|---|---|---|---|---|
| | e | d | c | b | a |
| Grain fraction, mm | 0.2–0.5 | 0.5–1.0 | 1.0–1.5 | 1.5–2.3 | >2.3 |
| Screen analysis, percent by wt | 13.1 | 27.8 | 34.3 | 18.6 | 6.2 |
| Gravity liquid g./cm.³ | 2.20 | 2.30 | 2.42 | 2.52 | 2.54 |
| Settled components, percent kieserite | 97.7 | 98.1 | 98.3 | 97.6 | 98.0 |

In this case 5 hydrocyclones were used for carrying out the continuous separation process and the five hydrocyclones contained gravity liquids of the specific gravity as set forth in Table 4 and 98% of kieserite were obtained having a maximum grain size distribution at particle diameter of between about 0.8–1.6 mm.

While the density differences of the gravity liquids in successive cyclones are given in Table 4 as being between 0.10 and 0.12 g./cm.³ density differences in the range of 0.06–0.12 g./cm.³ may also be used.

The process was carried out in a manner similar as described above in connection with Example 1 and FIG. 1, but instead of four, five hydrocyclones have been used and the raw material has been classified in a screening device similar to that shown at 1 in FIG. 1 into five fractions, which have been respectively fed into the five hydrocyclones in such a manner that the coarsest fraction is fed into the hydrocyclone containing a gravity liquid having the highest specific gravity, the smallest fraction into the hydrocyclone containing a gravity

TABLE 3

| Charge for hydrocyclone | From screening device 1 | Pipe | + | Upper end discharge from hydrocyclone | = Sum | = | Upper end discharge | Pipe | + | Apex discharge | Pipe |
|---|---|---|---|---|---|---|---|---|---|---|---|
| 2 (2.54 g./cm.³) a= | {2.33 (Ki)} {7.97 (O)} | 6 | | | {2.33 (Ki)} {7.97 (O)} | = | {0.98 (Ki)} {7.90 (O)} | 16 | + | {1.35 (Ki)} {0.97 (O)} | 12 |
| | | | | 20 | | | | | | | |
| 3 (2.42 g./cm.³) b= | {7.48 (Ki)} {20.12 (O)} | 7 | + | 2 | {8.46 (Ki)} {28.02 (O)} | = | {1.15 Ki()} {27.78 (O)} | 17 | + | {7.31 (Ki)} {0.24 (O)} | 13 |
| | | | | 21 | | | | | | | |
| 4 (2.30 g./cm.³) c= | {8.54 (Ki)} {24.96 (O)} | 8 | + | 3 | {9.69 (Ki)} {52.74 (O)} | = | {0.22 (Ki)} {52.59 (O)} | 18 | + | {9.47 (Ki)} {0.15 (O)} | 14 |
| | | | | 22 | | | | | | | |
| 5 (1.20 g./cm.³) d= | {6.55 (Ki)} {22.05 (O)} | 9 | + | 4 | {6.77 (Ki)} {74.64 (O)} | = | {0.50 (Ki)} {74.57 (O)} | ------ | + | {6.27 (Ki)} {0.07 (O)} | 19 |
| | | | | | | | | 11 | | | |
| Total charge | {24.90 (Ki)[1]} {75.10 (O)[2]} | | | | | = | {0.50 (Ki)} {74.57 (O)} Quasi-sylvinite. | ------ | + | {24.40 (Ki)} {0.53 (O)} Kieserite | |

[1] (Ki)=kg. kieserite.
[2] (O)=kg. other components, so-called quasi-sylvinite.
NOTE: 75.10 (O) are composed of 1738 kg. KCl plus 57.72 kg. NaCl. The numerals refer to reference numerals of the drawing.

EXAMPLE 2

With the process of the present invention it is possible to recover coarse grained kieserite as settled components in pure form. Since relatively coarse particles are processed, hydration of the kieserite is substantially avoided, and therefore a complete isolation can be achieved.

A hard salt with the following composition was treated: 11.4% $K_2O$, 32.5% kieserite, and 48% NaCl.

In Table 4 the grain fractions, the screen analysis of the recovered fractions, the specific gravity of the gravity liquids in the various hydrocyclones, and the percentage liquid having the lowest specific gravity, and all fractions between the coarsest and the finest fraction into hydrocyclones which contain corresponding gravity liquids between the highest and the lowest specific gravity. The floating components from each hydrocyclone, except the last one, were again passed through disintegrators in which the grain size of the floating components of one hydrocyclone was ground down to the grain size of the grain size fraction fed from the screening device 1 into the next following hydrocyclone and fed together with the grain size fraction coming from the screening device into the next hydrocyclone, whereas the settled components from each hydrocyclone were separately discharged and collected.

It will be noted that with the process according to the present invention only a small portion of the raw material has to be ground down to a particle size of less than 0.6 mm. in order to obtain a high yield of kieserite from the raw material, whereas according to the process of the prior art, the starting material would have to be ground down in its entirety to a particle size of less than 0.6 mm. in order to obtain the same result.

It is further pointed out that in practice in a gravity separation process with particles having a size below 0.6 mm. it has been found that sediments are obtained having a $MgSO_4$ content of only 96.3%. With small particles, an undisturbed settlement can hardly be achieved, as gravity settlement becomes very complicated already with particle sizes of between 1.0–0.5 mm. In a separation process in which density differences of particles having small diameters are utilized it is therefore necessary to use either hydrocyclones or settling tanks having large volumes. It is therefore another advantage of the process according to the present invention that only small amounts of minerals having a small particle size have to be handled.

The NaCl/KCl mixture obtained from the overflow end of the last hydrocyclone can be further processed in various ways to obtain a highly concentrated potassium salt (KCl) and rock salt (NaCl).

In accordance with the present invention, the term "mixture" is used in the sense of loosely connected (agglomerated) or even disconnected salts of different types as well as in the sense of particles formed by the intergrowth of different crystals. During the above-described procedure, the components of the mixture have to be separated and it was found that, surprisingly, on carrying out the described multistep separation, a complete separation of the two components can be effected. The low percent mixtures were passed from each hydrocyclone after a stepwise disintegration successively to the next following hydrocyclone containing particles having smaller size and a gravity liquid with a lower specific gravity.

The foregoing examples are set forth by way of illustration and without limitation of the present invention. The examples illustrate the improvement obtained with the process according to the present invention according to which in a very convenient and economical manner potash minerals can be separated in their components even if the densities of such components differ only very slightly. The components are recovered not only in a very concentrated form, but also with relatively coarse particles, thereby avoiding dust problems and superfluous grinding. In addition, the troublesome formation of magnesium-potassium double salts, affecting the yield of potassium in the concentrates, is eliminated.

According to the process of the present invention, substantially pure kieserite values can be recovered with high yields from potash minerals, such as hard salts. It is understood that not only the kieserite values, but also the other constitutents of the hard salt may be recovered in concentrated form, especially the so-called quasi-sylvinite.

In contrast to the known process, it was found unnecessary to grind the crude minerals completely into very fine particles. Surprisingly, the gravity separation and the grinding can be carried out in correlated steps, whereby those particles are selected which have to be divided further into smaller particles. Furthermore, the separation of the components in the hydrocyclones is considerably improved as in each separation step only particles are used which have specific and very similar diameters. Care, however, has to be taken in the disintegration steps which have to be performed in such a manner to reduce the formation of fines as far as possible so that the amount of dust particles will not exceed 20% of the total mass to be disintegrated. In the intermediate disintegration steps, the particles derived from the overflow of each hydrocyclone are ground down to 80% to the particle size which is fed from the screening device to the next hydrocyclone.

As gravity fluids, stable or unstable separation liquids can be used.

As stable gravity liquids, a mixture of halogenated hydrocarbons with organic liquids of low density, preferably toluene with a specific gravity of 0.87 g./cm.$^3$, benzene with a specific gravity of 0.88 g./cm.$^3$, or Diesel fuels may be used. As halogenated hydrocarbons especially tatrabromoethane "TBE" with a specific gravity of 2.96 g./cm.$^3$, and the like have been found appropriate.

Suitable mixtures such as used in the process of Example 1 can be prepared as follows:

TABLE 5

| Density | TBE | | Toluene | | Gravity liquid TBE plus toluene | |
|---|---|---|---|---|---|---|
| | Liters | Kilograms | Liters | Kilograms | Liters | Kilograms |
| 2.54 | 79.9 | 236.5 | 20.1 | 17.5 | 100 | 254 |
| 2.42 | 74.2 | 219.6 | 25.8 | 22.4 | 100 | 242 |
| 2.30 | 68.4 | 202.5 | 31.6 | 27.5 | 100 | 230 |
| 2.20 | 63.6 | 188.3 | 36.4 | 31.7 | 100 | 220 |

The recovery of stable gravity liquids after separating off the solids can be performed in a manner known per se by readjusting the density either by addition or distilling off one or more of the components.

As unstable gravity liquids an aqueous saturated solution of KCl and NaCl may be used which may have an additional content of more than 80 g./l. of $MgCl_2$ and a self-regulating amount of $MgSO_4$. Such solutions are charged with ferrosilicon and related substances, if used for the separation of hard salts.

A suitable gravity solution may be composed as follows: KCl 93 g./l., $MgCl_2$ 100 g./l., $MgSO_4$ 81 g./l., NaCl 135 g./l., $H_2O$ 875 g./l. charged with 1.590 g./l. of ferrosilicon or 1.610 g./l. magnetite to obtain a turbidity density of 2.2.

It will be understood that each of the elements described above, or two or more together, may also find a useful application in other types of continuous processes for the upgrading of potash minerals differing from the type described above.

While the invention has been illustrated and described as embodied in continuous process for the upgrading of potash minerals consisting of hard salts by gravity separation to obtain kieserite and so-called quasi-sylvinite therefrom, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. Improved process for the separation of potash minerals consisting essentially of hard salts by gravity liquid separation to recover coarse kieserite and the accompanying constitutents in highly concentrated form therefrom, said process comprising the following steps:
   (a) disintegrating said minerals into coarse particles;
   (b) classifying said disintegrated minerals according to their particle size into at least three fractions;
   (c) passing said fractions separately into at least three hydrocyclones which are connected in parallel at the apex discharge ends and in series at the upper discharge ends thereof and respectively containing gravity liquids of decreasing specific gravities so that the coarsest particle fraction is suspended in the liquid with the highest specific gravity and the smallest particle fraction other than the finest fraction from said classifying step in the liquid with the lowest specific gravity and all further particle fractions between the coarsest and the smallest correspondingly in liquids with specific gravities between the highest and lowest specific gravity;

(d) separately recovering the floated components from the upper end and the settled components from the apex discharge end of each hydrocyclone;

(e) collecting the settled components consisting of coarse kieserite ($MgSO_4 \cdot H_2O$) from all but the last hydrocyclone and separately discharging the settled components from said last hydrocyclone;

(f) disintegrating the floated components from each but the last hydrocyclone to a particle size corresponding to the particle size of the particle fraction passed into the next following hydrocyclone having the next lower specific gravity; and (g) passing said disintegrated components from the respective hydrocyclone into the next following hydrocyclone having the next lower specific gravity, at least steps c–g being carried out continuously to thereby recover highly separable kieserite concentrates in the form of settled components from each hydrocyclone and "quasi-sylvinite" highly concentrated as floated components from the last hydrocyclone.

2. A process as defined in claim 1, wherein said disintegrated hard salts are classified according to their particle size into more than three fractions, and wherein a number of hydrocyclones equal to the number of fractions are used.

3. A process as defined in claim 1, wherein hard salt is disintegrated and classified into particle size fractions of between 1.5–2.3 mm. diameter; 1–1.5 mm.; 0.5–1 mm.; and 0.2–0.5 mm. and in which these fractions are passed into hydrocyclones containing gravity liquids having density differences of between about 0.06–0.12 g./cm.$^3$.

4. A process as defined in claim 3, wherein the density differences between the gravity liquids contained in successive hydrocyclones is about 0.1 g./cm.$^3$.

References Cited

UNITED STATES PATENTS

| | | |
|---|---|---|
| 2,139,047 | 12/1938 | Tromp. |
| 2,590,756 | 3/1952 | Colin. |
| 2,668,667 | 2/1954 | Fern. |
| 2,701,641 | 2/1955 | Krijgsman. |
| 2,738,069 | 3/1956 | Roller. |
| 2,781,906 | 2/1957 | Fontein. |
| 2,932,395 | 4/1960 | Marot. |
| 3,063,562 | 11/1962 | Adams. |
| 3,331,504 | 7/1967 | O'Connell. |

FOREIGN PATENTS 887,492   1/1962   Great Britain.

FRANK W. LUTTER, Primary Examiner

W. L. MENTLIK, Assistant Examiner

U.S. Cl. X.R.

209—2, 17, 173, 211; 241—29